United States Patent
Voss-Wolff

(10) Patent No.: US 12,499,622 B2
(45) Date of Patent: Dec. 16, 2025

(54) LATE STAGE REPROJECTION USING TESSELLATED MESH

(71) Applicant: Microsoft Technology Licensing, LLC, Redmond, WA (US)

(72) Inventor: Christian Voss-Wolff, Herzberg am Harz (DE)

(73) Assignee: Microsoft Technology Licensing, LLC., Redmond, WA (US)

( * ) Notice: Subject to any disclaimer, the term of this patent is extended or adjusted under 35 U.S.C. 154(b) by 211 days.

(21) Appl. No.: 18/189,171

(22) Filed: Mar. 23, 2023

(65) Prior Publication Data
US 2024/0320921 A1   Sep. 26, 2024

(51) Int. Cl.
*G06T 17/20* (2006.01)
*G06T 15/00* (2011.01)
*G06T 19/20* (2011.01)

(52) U.S. Cl.
CPC .......... *G06T 17/205* (2013.01); *G06T 15/005* (2013.01); *G06T 19/20* (2013.01); *G06T 2219/2012* (2013.01)

(58) Field of Classification Search
CPC ............................ G06T 17/205; G06T 15/005
See application file for complete search history.

(56) References Cited

U.S. PATENT DOCUMENTS

| | | | |
|---|---|---|---|
| 7,274,810 B2 | 9/2007 | Reeves et al. | |
| 8,026,912 B1 * | 9/2011 | Danskin | G06T 15/005 345/428 |
| 8,730,236 B2 | 5/2014 | Fishwick | |
| 9,928,655 B1 | 3/2018 | Alston | |
| 10,403,032 B2 | 9/2019 | Schmalstieg et al. | |
| 10,445,922 B2 | 10/2019 | Anderson et al. | |
| 11,032,534 B1 * | 6/2021 | Voss-Wolff | G06F 3/013 |
| 11,776,214 B2 * | 10/2023 | Lieutier | G06T 17/205 345/419 |
| 2003/0011595 A1 | 1/2003 | Goel et al. | |
| 2008/0001952 A1 * | 1/2008 | Srinivasan | G06T 1/20 345/502 |
| 2009/0207179 A1 * | 8/2009 | Huang | G06T 15/205 345/505 |
| 2009/0237400 A1 * | 9/2009 | Patel | G06T 17/20 345/423 |
| 2010/0164954 A1 * | 7/2010 | Sathe | H04N 19/29 345/423 |
| 2010/0310155 A1 | 12/2010 | Newton | |

(Continued)

FOREIGN PATENT DOCUMENTS

WO   2021167704 A1   8/2021

OTHER PUBLICATIONS

Chen, Mesh Smoothing Schemes Based on Optimal Delaunay Triangulations, 2004 (Year: 2004).*

(Continued)

*Primary Examiner* — Phong X Nguyen
(74) *Attorney, Agent, or Firm* — Barta Jones, PLLC

(57) ABSTRACT

A method of late stage reprojection comprises accessing a depth buffer and a color image, accessing a depth complexity map, computing an indexed tessellated mesh from the depth complexity map using a database of pre-computed patterns and reprojecting the indexed tessellated mesh to correct the color image.

20 Claims, 14 Drawing Sheets

(56) References Cited

U.S. PATENT DOCUMENTS

| | | | |
|---|---|---|---|
| 2014/0063012 A1* | 3/2014 | Madani | G06T 17/20 |
| | | | 345/522 |
| 2015/0029218 A1 | 1/2015 | Williams | |
| 2017/0115488 A1 | 4/2017 | Ambrus et al. | |
| 2017/0285736 A1 | 10/2017 | Young | |
| 2017/0302918 A1 | 10/2017 | Mammou | |
| 2017/0302972 A1 | 10/2017 | Zhang | |
| 2017/0358132 A1* | 12/2017 | Munshi | G06T 15/80 |
| 2017/0374343 A1 | 12/2017 | Boulton et al. | |
| 2018/0082469 A1 | 3/2018 | Andersson | |
| 2018/0189925 A1* | 7/2018 | Lee | G09G 5/363 |
| 2018/0218210 A1 | 8/2018 | Georgiou et al. | |
| 2018/0270531 A1 | 9/2018 | Ye | |
| 2018/0286112 A1 | 10/2018 | Lauritzen et al. | |
| 2018/0336008 A1 | 11/2018 | Nakagawa | |
| 2019/0052838 A1 | 2/2019 | Ashkenazi | |
| 2019/0340812 A1 | 11/2019 | Fuetterling et al. | |
| 2020/0202481 A1 | 6/2020 | Brigg et al. | |
| 2020/0327740 A1 | 10/2020 | Frommhold et al. | |
| 2020/0342656 A1* | 10/2020 | Cichocki | G06T 15/20 |
| 2020/0348515 A1 | 11/2020 | Peuhkurinen | |
| 2021/0133850 A1 | 5/2021 | Ayush | |
| 2021/0264661 A1* | 8/2021 | Voss-Wolff | G06T 15/005 |
| 2021/0358219 A1 | 11/2021 | Melkote Krishnaprasad | |
| 2021/0373678 A1 | 12/2021 | Chauvin | |
| 2021/0409235 A1 | 12/2021 | Cui | |
| 2022/0066543 A1 | 3/2022 | Rhyu | |
| 2022/0253966 A1 | 8/2022 | Croxford | |
| 2022/0301262 A1 | 9/2022 | Aksit | |
| 2022/0394225 A1 | 12/2022 | Champion | |
| 2022/0414984 A1* | 12/2022 | Malhotra | H04N 19/423 |
| 2023/0039100 A1 | 2/2023 | Melkote Krishnaprasad | |
| 2023/0134779 A1* | 5/2023 | Reinert | G06T 15/20 |
| | | | 345/420 |
| 2024/0098243 A1 | 3/2024 | Damveld | |
| 2024/0144597 A1* | 5/2024 | Mason | G06T 17/10 |
| 2024/0312140 A1 | 9/2024 | Voss-Wolff | |
| 2024/0379030 A1 | 11/2024 | Ikenoue | |

OTHER PUBLICATIONS

International Search Report and Written Opinion received for PCT Application No. PCT/US2024/019306, Jul. 5, 2024, 13 pages.

International Search Report and Written Opinion received for PCT Application No. PCT/US2024/019316, Jun. 28, 2024, 13 pages.

Meseth, Jan, "Towards Predictive Rendering in Virtual Reality," Doctoral dissertation, Bonn, University, Oct. 1, 2016, 370 Pages.

Wismann, et al., "Accelerated Stereo Rendering with Hybrid Reprojection- Based Rasterization and Adaptive Raytracing," IEEE Conference on Virtual Reality and 3D User Interfaces, 2020, 08 Pages.

Decision to Grant pursuant to Article 97(1) received in European Application No. 21702329.0, mailed on Jan. 30, 2025, 2 pages.

Notice of Allowance mailed on Nov. 28, 2023, in U.S. Appl. No. 18/185,432, 14 pages.

"Tutorial 9 : VBO Indexing", Retrieved From: http://www.opengl-tutorial.org/intermediate-tutorials/tutorial-9-vbo-indexing/, Retrieved On: May 16, 2022, 4 Pages.

"Notice of Allowance Issued in U.S. Appl. No. 16/796,640", Mailed Date: Feb. 9, 2021, 9 Pages.

Gao, et al., "Mesh Simplification with Average Planes for 3-D Image", In Proceedings of International Conference on Systems, Man & Cybernetics: "Cybernetics Evolving to Systems, Humans, Organizations, and their Complex Interactions", Oct. 8, 2000, pp. 1412-1417.

Khoury, et al., "Adaptive GPU Tessellation with Compute Shaders", Retrieved from: https://onrendering.com/data/papers/isubd/isubd.pdf, Oct. 1, 2018, 14 Pages.

Niessner, et al., "Real-Time Rendering Techniques with Hardware Tessellation", In Journal of Computer Graphics Forum, vol. 35, Issue 1, Feb. 2016, pp. 113-137.

Pajak, et al., "Scalable Remote Rendering with Depth and Motion-flow Augmented Streaming", In Journal of Computer Graphics Forum, vol. 30, Issue 2, Apr. 28, 2011, 10 Pages.

"International Search Report and the Written Opinion Issued in PCT Application No. PCT/US21/012024", Mailed Date: Apr. 23, 2021, 15 Pages.

Communication under 71(3) Received for European Application No. 21702329,0, mailed on Oct. 28, 2024, 09 pages.

International Search Report and Written Opinion received for PCT Application No. PCT/US2024/019307, Jul. 10, 2024, 16 pages.

Non-Final Office Action mailed on May 7, 2025, in U.S. Appl. No. 18/185,448, 12 pages.

International Preliminary Report on Patentability (Chapter I) received for PCT Application No. PCT/US2024/019306, mailed on Oct. 2, 2025, 13 pages.

International Preliminary Report on Patentability (Chapter I) received for PCT Application No. PCT/US2024/019307, mailed on Oct. 2, 2025, 11 Pages.

International Preliminary Report on Patentability (Chapter I) received for PCT Application No. PCT/US2024/019316, mailed on Oct. 2, 2025, 9 pages.

Final Office Action mailed on Oct. 10, 2025, in U.S. Appl. No. 18/185,448, 15 pages.

* cited by examiner

LATE STAGE REPROJECTION USING TESSELLATED MESH

BACKGROUND

The present technology relates to image rendering for example in augmented/mixed reality scenarios. When system latency means that the user's position changes between the time when image rendering starts and the time the image is displayed, the image is misaligned with the user's position at display time (pose error).

Late-stage reprojection (LSR) is a way to correct for pose error by computing an updated image from a rendered image based on an updated pose estimate.

The embodiments described below are not limited to implementations which solve any or all of the disadvantages of known late-stage reprojection methods.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An efficient way of achieving accurate late stage reprojection is described, for situations where late stage reprojection takes into account depth in an image, where the depth is represented using a tessellated mesh.

A method of late stage reprojection comprises accessing a depth buffer and a color image, accessing a depth complexity map, computing an indexed tessellated mesh from the depth complexity map using a database of pre-computed patterns and reprojecting the indexed tessellated mesh to correct the color image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
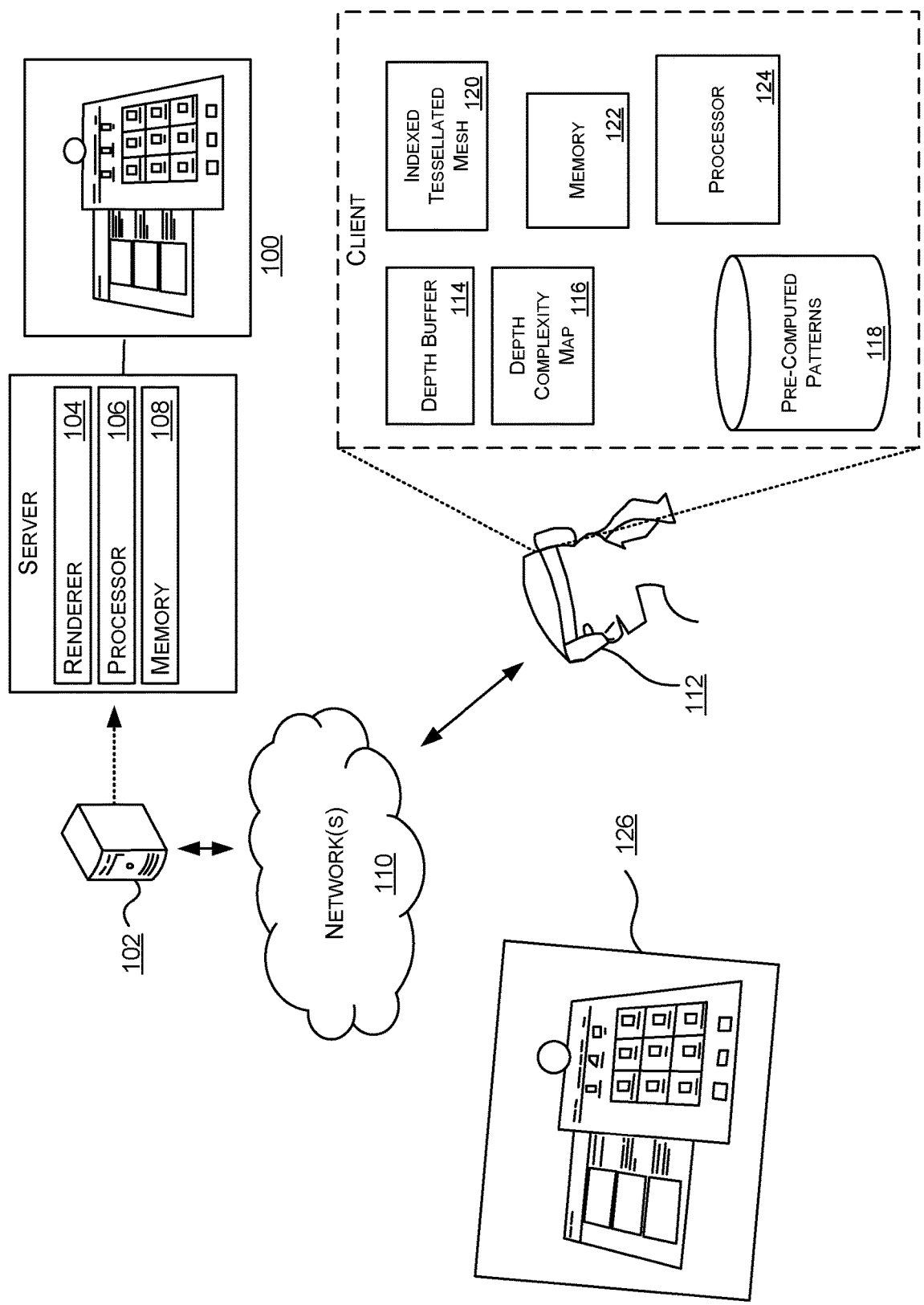
FIG. 1 is a schematic diagram of late stage reprojection using a tessellated mesh.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The technology described herein relates to the rendering of imagery for example in augmented/mixed virtual reality scenarios. In various examples, an image is rendered based on a predicted pose of a client device for example a head-mounted display (HMD). A pose is a 3D position and orientation. Late stage reprojection (LSR) is used where rendering and communications latency means that the pose of an HMD or other display device changes between the time that the image is rendered and the time that the image is displayed at the HMD. In some examples, the image is rendered remotely at a server with access to more computational resources than the client device, and latency arises from data being sent over a network. Latency means that the rendered image is misaligned in relation to the HMD or other display device pose at display time. This is referred to as pose error. Late stage reprojection is a method of correcting for the pose error by modifying the rendered image in the light of an updated pose of the HMD or other display device.

Some methods for LSR involve applying corrections to the image based on depth information contained in a rendered depth buffer. In various examples, the depth buffer encodes distance from an HMD or other display device for each pixel in a rendered color image. A late stage reprojection process may determine the correction applied to each pixel during late stage reprojection. For example, parts of the image which appear closer to a user may require a correction of larger magnitude than parts which appear further away from a user.

In various examples, methods for LSR involve sampling positions from a rendered depth buffer according to a mesh, with positional corrections computed for each mesh vertex and corrections interpolated between the vertices. A regularly divided grid mesh may be used to sample the depth buffer. Using a low resolution regularly divided grid means that some parts of the depth buffer are under-sampled, resulting in visual artifacts such as swimming or wobbling of the reprojected image. Using a high resolution regularly divided grid reduces visual artifacts, but is associated with a high computational reprojection cost.

In various examples an adaptively tessellated grid is used which has higher resolution in regions of higher content complexity and lower resolution in regions of lower content complexity. Using an adaptively tessellated grid means that visual artifacts are reduced at a lower computational reprojection cost.

Tessellation comprises the subdivision of a regular grid into subdivided parts. In various examples tessellation of square mesh patches is achieved by dividing a patch into subdivided parts and converting the mesh patch into a triangle representation. In various examples, tessellation is carried out by a tessellator which is a hardware unit or program which produces a subdivided piece of mesh according to input subdivision factors. Subdivision factors are numbers which control the number of subdivided segments in the interior of a mesh patch or along an edge of the mesh patch. Some examples use specialist hardware units for tessellation. Although the hardware is specialist hardware for tessellation, it is not tailored to the requirements of LSR. Even though these methods are associated with a lower cost of reprojection once the mesh has been generated, the computational cost of adaptive tessellation is significant in comparison to fixed grid reprojection techniques. In existing methods, the number of possible subdivisions for a patch of mesh is very high. For example, a square patch of mesh is divided in the horizontal and vertical directions as well as along each of the four edges using fractional subdivision levels. Tessellated patches may therefore be computed on the fly and on specialist hardware. The specialist hardware is power inefficient, and its use is often infeasible for example in remote rendering scenarios where a client device has a limited computational budget and high quality reprojection is required to compensate for high latency inherent to a networked system. Therefore, methods of tessellation for LSR which produce adaptively tessellated meshes at a lower computational cost are desired.

The present technology provides a method for high quality late stage reprojection using adaptive tessellation in a more computationally efficient manner. The tessellator design disclosed herein enables late stage reprojection to be achieved effectively and efficiently, and the design enables the use of a high-quality late stage reprojection at lower power cost. Motion to photon latency, the time difference between computing the updated pose prediction and displaying the reprojected result to the user, is also reduced thereby improving the user experience.

In various examples of the present technology, a rendered color image and depth buffer are accessed. The depth buffer is a data structure which corresponds to the color image, and it encodes information representing depth in the color image. In various examples, the depth buffer and the color image are computed based on an initial predicted pose of a client device such as a head-mounted display (HMD) in an augmented/virtual reality example. The initial pose is predicted in some examples using captured sensor data such as from any one or more of: a global positioning system, an accelerometer, a gyroscope, a depth camera, a video camera, a color camera. In some examples, the depth buffer and the color image are computed on a server which is connected to a client device. A depth complexity map is also accessed. In various examples, the depth complexity map encodes information about the geometric complexity of the depth buffer. A depth complexity map is a 2D array of numerical values, each numerical value corresponding to an image element of a depth map corresponding to the depth buffer. In some examples the numerical values are planar deviation values which quantify the amount by which a depth map tile differs in depth from a plane of a surface depicted in the depth map. A planar deviation value may be calculated as a root mean square error between depth values in a tile of the depth map and a least-square plane fitted to depth values in a tile of the depth map. In an example, depth values in a tile are perspectively projected by being non-linearly mapped between near and far planes.

An indexed tessellated mesh is computed from the depth complexity map using a database of pre-computed patterns. Tessellation comprises the subdivision of a regular grid into subdivided parts. In various examples, tessellation of an untessellated square mesh patch comprises dividing the mesh patch into subsections and converting it into a triangle representation. Using the depth complexity map to compute the mesh means that parts of the depth buffer with lower complexity can be more sparsely sampled while parts of the depth buffer with higher complexity can be more densely sampled.

Computational resources and power are therefore allocated efficiently, allowing for high quality reprojection at a lower reprojection cost. Computing an indexed tessellated mesh using a database of pre-computed patterns means that generating the mesh is more efficient in terms of power and computational resources. Some LSR technology generates mesh patches on the fly; this is because the number of possible combinations of subdivision factors is so high that it is infeasible to pre-compute mesh patterns given typical hardware limitations. Compared to existing LSR technology, the present technology is more efficient because the pre-computed patterns are independent of each individual reprojection event. At runtime, the database of precomputed patterns may be queried in order to compute the indexed tessellated mesh.

Using an indexed mesh rather than an unindexed mesh means that vertex information is shared between mesh patches, and the mesh is therefore more efficient to store and render. This is because an indexed mesh representation is more compact in terms of computer memory and also faster to render at runtime.

In some examples, methods comprise storing the indexed tessellated mesh in memory and then, at a later time, computing an updated pose prediction of a pose of a client device, retrieving the indexed tessellated mesh from memory, and rendering the indexed tessellated mesh using the updated pose prediction. The processes of tessellation and rendering of the mesh are therefore separate. Splitting tessellation and rendering during LSR means that reprojection latency is reduced. Reprojection latency, also referred to as photon latency, is the time difference between computing the updated pose prediction and displaying the reprojected result to the user. Because tessellation does not depend on the updated pose prediction in examples, tessellation is carried out outside of the reprojection latency critical path which determines the motion to photon latency for reprojection.

In some examples of the present technology, methods of LSR are performed by a client device and the database of pre-computed patterns is stored at the client device. Performing LSR at the client device reduces reprojection latency and also reduces the risk of network losses or other negative effects of streaming data over a network from a server to a client device.

In some examples of the present technology, the database of pre-computed patterns comprises a table of data corresponding to tessellated square mesh patches, each tessellated square mesh patch being indexed according to three subdivision factors. A tessellated square mesh patch is a piece of square mesh which has been subdivided into segments. In various examples the segments are triangular segments. The data corresponding to a tessellated square mesh patch corresponds to a tessellation pattern of the tessellated square mesh patch. By storing data corresponding to tessellated square mesh patches in an indexed database, patterns can be extracted from the database efficiently at runtime by querying the database with subdivision factors. Using square mesh patches rather than patches of another shape allows the number of possible patches to be reduced, making the indexed database more efficient.

In some examples of the present technology, the subdivision factors are integers. In an example the integers are up to but not including the size of the tessellated square mesh patch in pixels. Subdivision factors control the number of subdivided segments in the interior or along an edge of a mesh patch. By using integer subdivision factors, the number of possible combinations of subdivision factors is reduced compared to methods which use fractional subdivision factors. The subdivision factors are also Integers up to the size of the patch in pixels, and not higher, and this further reduces the number of subdivision factors. Using higher subdivision factors would lead to oversampling of the depth buffer, meaning the use of further computational resources but without any improvement in LSR quality. Reducing the number of combinations of subdivision factors means that mesh patterns may be pre-computed and stored in a database to be queried at runtime. Furthermore, use of fractional subdivision factors for LSR means that patch vertices which are positioned between pixels of the depth buffer cause artifacts if a vertex straddles a discontinuity between a foreground object and a background object in the depth buffer. Using integer subdivision therefore improves the quality of LSR compared to existing technology.

In some examples, one of the subdivision factors is a subdivision factor for the interior of the tessellated square mesh patch, another subdivision factor is a subdivision factor for the top edge of the square mesh patch, and another subdivision factor is a subdivision factor for the top left edge of the tessellated square mesh patch. This is different from tessellator technology which uses six subdivision factors, two of which control the number of subdivided segments in the interior of the patch in the horizontal and vertical directions and four of which control the number of subdivided segments along each of the four edges of the patch. Examples of the present technology use one subdivision factor for the interior of the mesh, or in other words the horizontal and vertical interior subdivision factors are equal. Subdivision factors for the top and left edge of each patch are specified and patches may be stitched together according to these factors, rather than using a bi-directional mapping. Reducing the number of subdivision factors means that the number of possible combinations of subdivision factors is reduced, which means that mesh patterns may be pre-computed and stored in a database to be queried at runtime.

In some further examples, each vertex in the square patch corresponds to one pixel in the depth buffer. This means that the depth buffer is sampled efficiently, without oversampling, and avoids the production of artifacts and therefore improves the user experience.

In an example, each untessellated square mesh patch covers 8×8 pixels in the depth buffer. The three subdivision factors (inner, top edge and left edge) each range from 1 to 7. Therefore, there are 343 (=7×7×7) unique combinations of subdivision factors. This is compared to the billions of possible tessellated patched which can be produced by an existing tessellator hardware unit with six subdivision factors ranging from 1 to 64, or an effectively unbounded number of combinations when allowing for fractional factors.

In some example methods for LSR, the indexed tessellated mesh is computed by: reading three subdivision factors from a map of subdivision factors; querying the database of pre-computed patterns with the three subdivision factors; retrieving pattern data corresponding to a tessellated square mesh patch from the database of pre-computed patterns; and appending the tessellated square mesh patch data to the indexed tessellated mesh by combining local coordinates of the vertices within the tessellated square mesh patch with a global position of the tessellated square mesh patch and copying the resulting values to an output mesh buffer. A map of subdivision factors specifies the desired level of tessellation for each patch in an undivided regular grid. The three subdivision factors which are read from the map of subdivision factors are used to query the database of pre-computed patterns and pattern data corresponding to a tessellated square mesh patch is retrieved. The patch data is appended to the indexed tessellated mesh. Generating an indexed tessellated mesh in this way is computationally efficient because the patterns are pre-computed and so at runtime the databased is queried, rather than generating tessellated mesh patches on the fly.

In some further examples, the map of subdivision factors is computed using the depth complexity map and further the depth complexity map is computed using a planar deviation metric. In some examples, the depth buffer is divided into a plurality of tiles. The planar deviation metric is computed using the depth buffer and is for example a planar deviation error value which quantifies the extent to which the geometry of a tile in the depth buffer deviates from a plane fitted to values in the depth buffer. A planar deviation value may be a planar deviation error value calculated as a root mean square error between depth values in a tile and a least-square plane fitted to depth values in a tile. The planar deviation metric is therefore representative of the geometric complexity of each tile in the depth buffer. The map of subdivision factors is computed using the depth complexity map because where the depth complexity is higher, more subdivisions are typically required to produce a high quality reprojection.

In some examples, the indexed tessellated mesh is optimized. Mesh optimization means improving the quality of tessellated meshes by improving the shape and distribution of triangles within the tessellated mesh. As an illustrative example, meshes which comprise long and thin triangles can cause various performance problems, for example due to increasing quad overdraw during rendering. Unoptimized meshes comprise more longer, thinner triangles than optimized meshes. Some tessellator methods for LSR preclude the use of mesh optimization such as where tessellation is performed on the fly. The present technology uses a database of pre-computed patterns which may be optimized such that optimized patterns are retrieved from the database at runtime. Therefore, in examples of the present technology mesh optimization does not contribute to reprojection latency. Using an optimized mesh means that in examples of the present technology, LSR quality is improved while maintaining computational efficiency.

In some examples, the mesh is optimized by optimizing each square mesh patch using one or both of Laplacian smoothing and Delaunay triangulation.

In some examples, the indexed tessellated mesh is a vertex-buffer-less indexed tessellated mesh. In general, indexed meshes are associated with an index buffer which stores index data and a vertex buffer which stores vertex data. In general, an indexed mesh is considered fully connected if the vertex buffer does not contain any duplicate vertices. In some examples of the present technology, the vertex buffer of the indexed tessellated mesh is empty, and therefore the indexed tessellated mesh is a vertex-buffer-less indexed tessellated mesh. The resulting mesh is fully connected. In the vertex-buffer-less indexed tessellated mesh, data associated with each vertex is encoded directly into the index buffer keys. In some examples, an X and Y position of each vertex are stored in the upper 16 bits and lower 16 bits respectively of each 32 bit index in the index buffer. When the mesh is rendered, the index value may be decoded back into X and Y coordinates.

FIG. 1 is a schematic diagram of late stage reprojection using a tessellated mesh including apparatus used. In an example remote rendering scenario, a client device 112 is in communication with a server 102 via network 110. Network 110 is any communications network such as the internet, an intranet, a wireless communications network or other communications network. In various examples, the client device 112 is a head-worn computer such as a head-mounted device (HMD). It is not essential for the client device 112 to be an HMD as illustrated in FIG. 1. Other client devices are usable which are display devices such as smart phones, tablet computers and other client devices. Client device 112 comprises at least one processor 124 and one memory 122. Server 102 comprises at least one processor 106 and one memory 108. The server 102 may be a remote entity such as a cloud server or may be a computing entity located geographically near the client such as in the same building. In some cases the server 102 is a companion device of the client 112. Renderer 104 at the server 102 renders a color image 100 and a corresponding depth image based on a predicted pose of the client device 112 at a display time and sends it via the network to client device 112. The server 102 renders the color image 100 and the corresponding depth image from a complex 3D model. In the example of FIG. 1 the server 102 has rendered a color image 100 and corresponding depth image of a graphical user interface from a 3D model. Latency introduced by the time taken to render from the complex 3D model and the time taken to transmit the rendered image to the client means that the predicted pose used to render the color image becomes outdated. Late stage reprojection is performed in order to correct for pose error.

Depth buffer 114 is memory which stores a depth image corresponding to color image 100. In various examples, the depth buffer is configured to store an array including a depth value for each pixel of color image 100. In various examples, the depth buffer 114 stores distance from the user's head when the user is wearing an HMD. More generally, the depth buffer stores distance from a view point of the display device to virtual surfaces in the environment which are to be depicted in a hologram. When a pose correction is applied, information stored in the depth buffer determines the scaling of the correction applied to each pixel in the color image 100. Depth complexity map 116 stores the relative content complexity of depth buffer 114.

In various examples, client device 112 computes an indexed tessellated mesh from depth complexity map 116 using the database of pre-computed patterns 118. Indexed tessellated mesh 120 is reprojected to correct color image 100 and produce a corrected color image which is displayed by HMD 112 to produce hologram 126.

A method of late stage reprojection comprises accessing a depth buffer and a color image. Using a depth buffer is a technically efficient and reliable way to store depth values from a depth image. Accessing a color image is useful as a first operation in a process of reprojecting the color image in late stage reprojection to address projection latency. The method comprises accessing a depth complexity map. A depth complexity map is a technically efficient and reliable way to store information about which regions of the depth image in the depth buffer are more complex. The method comprises computing an indexed tessellated mesh from the depth complexity map using a database of pre-computed patterns. Having an indexed tessellated mesh is particularly beneficial for computational efficiency since it is indexed. Using a database of pre-computed patterns gives technical efficiency at least because it is not necessary to compute the patterns on the fly. The method comprises reprojecting the indexed tessellated mesh to result in the color image which gives the technical benefit that reprojection latency is accommodated.

Figure 2:
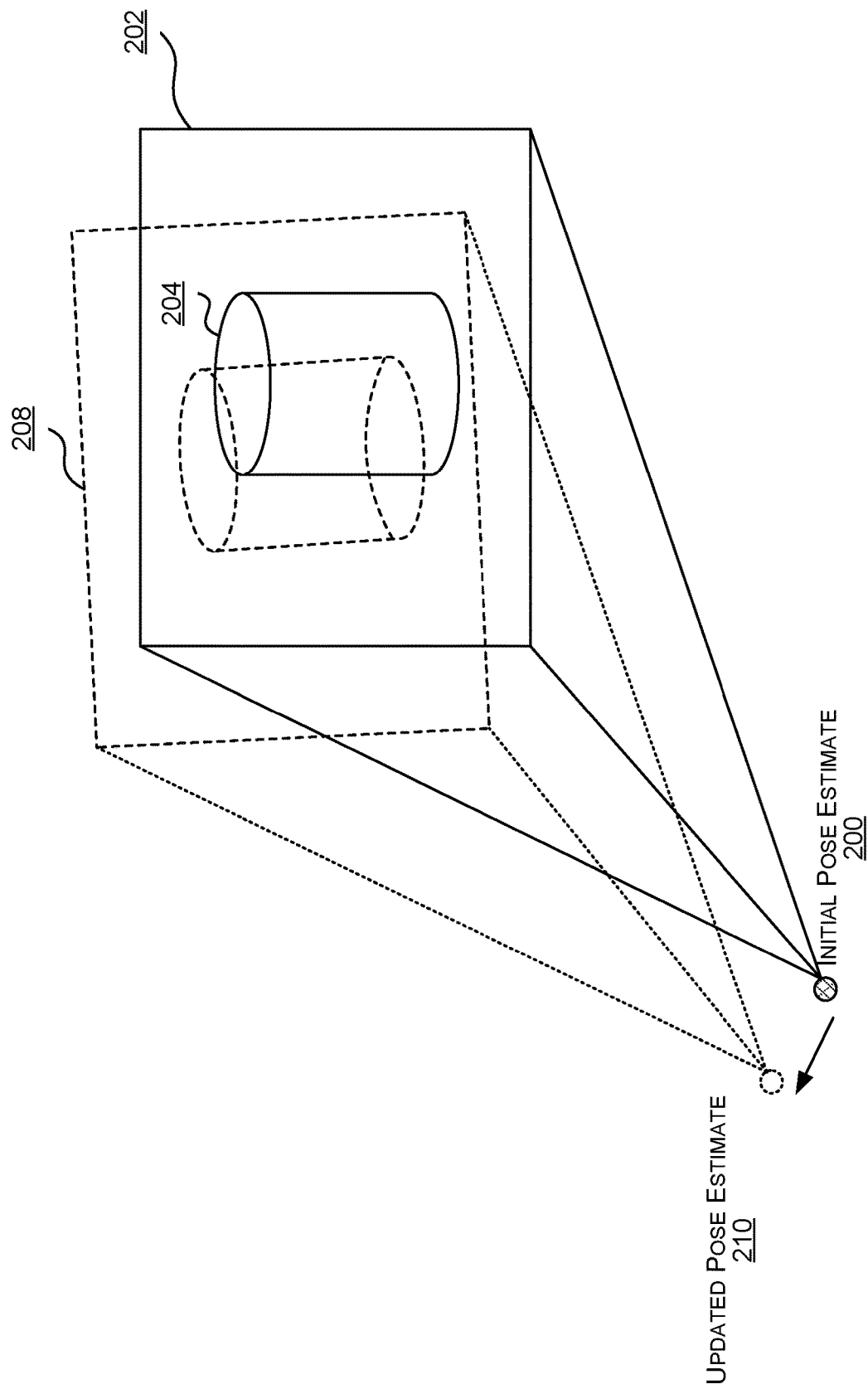
FIG. 2 is a schematic diagram of late stage reprojection.

FIG. 2 is a schematic diagram of late stage reprojection, which depicts one example of a portion of a pre-rendered image 202 and an updated image 208. A pre-rendered image is an image which has been rendered based on an initial pose estimate 200 for e.g a client device such as an HMD. The initial pose estimate 200 is determined in some examples based on a current position and orientation of a client device and an acceleration and velocity of a client device immediately prior to determining the initial pose estimate. An updated image is an image computed from a pre-rendered image using reprojection. The pre-rendered image 202 comprises a rendered image based on the initial pose estimate 200 and is rendered using a GPU or other rendering system that has the ability to render a three-dimensional model into a two-dimensional image given a particular pose. The updated pose estimate 210 is determined based on updated pose information that is acquired at a point in time subsequent to the determination of the initial pose estimate. In one example, the updated pose information is generated based on camera-based pose tracking information and/or a combination of camera-based pose tracking information and low-latency inertial measurement unit IMU motion information corresponding to a client device.

The updated image 208 is generated using planar deviation reprojection. The pre-rendered image comprises a depth image and a color image. In some examples, the updated image 208 (which is a color image) is generated by applying a pixel offset adjustment to the color image of the pre-rendered image 202. The degree of the pixel offset adjustment may depend on a difference between the updated pose estimate and the initial pose estimate as well as on information in an image rendered from the 3D mesh fitted to the features which deviate from the plane. As depicted, an image 204 of a virtual object (i.e., a virtual cylinder) has been pixel shifted in both the X-dimension and the Y-dimension (e.g., by 4 pixels to the left and by 3 pixels up). In one example, the updated image 208 is generated using a pixel offset adjustment computed by rendering a tessellated mesh. To compute the planar deviation reprojection, an image is rendered from the 3D polygon mesh using an updated pose of a display device. The image is then used to transform a color image corresponding to the depth image so as to produce a reprojection of the color image.

Figure 3:
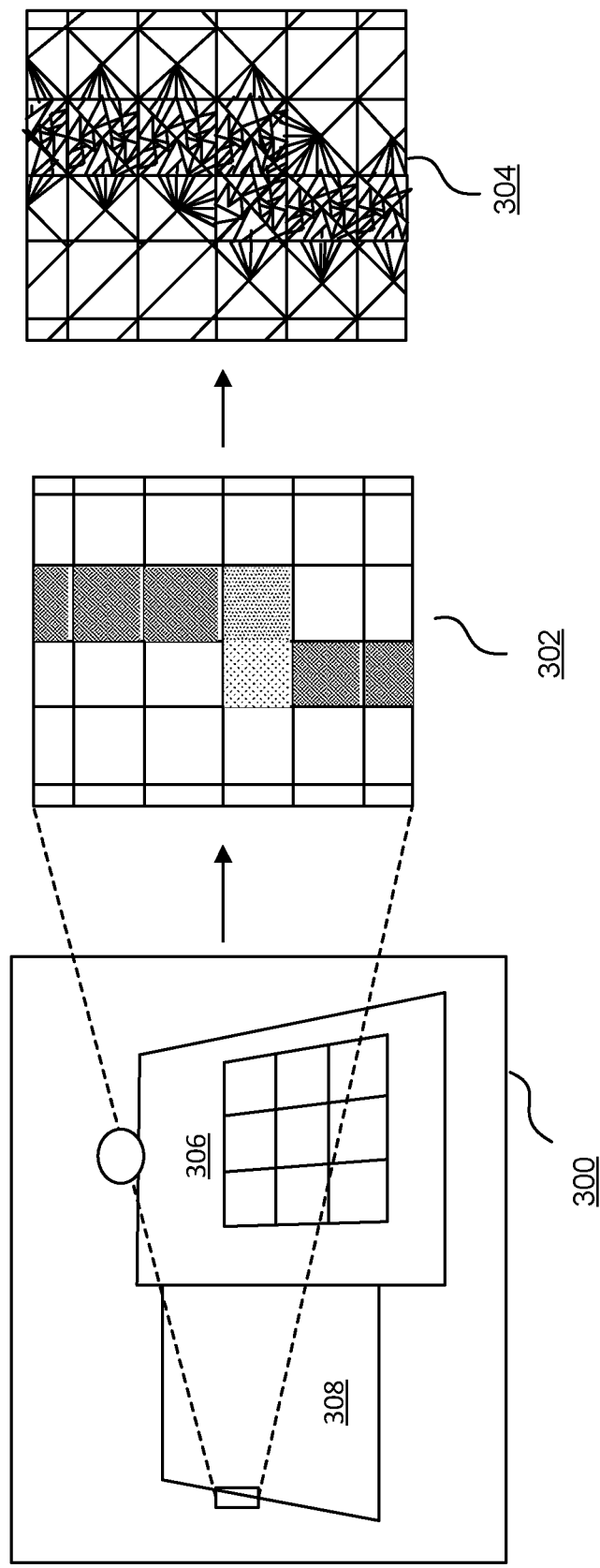
FIG. 3 is a schematic diagram of generating a tessellated mesh using a depth buffer and a depth complexity map.

FIG. 3 is a schematic diagram of generating a tessellated mesh using a depth buffer 300 and a depth complexity map 302. Depth buffer 300 corresponds to an example augmented reality scene. The scene includes a first user interface panel 306 having a first depth and a second user interface panel 308 having a second depth. The second depth is greater than the first depth. Part of a depth complexity map 302 corresponds to some of the edge of the first user interface as depicted by the black dotted lines. Different depth complexity values are illustrated in each tile of depth buffer 300.

Tiles along the edge of the first user interface have higher depth complexity values which are illustrated with dotted tiles; a higher density of dots schematically represents more depth complexity. The edge of second user interface 308 is more geometrically complex than parts of depth buffer 300 in the interior of a user interface. A part of an adaptively tessellated mesh 304 for the part of the edge of the second user interface 308 is also illustrated. In the less geometrically complex parts of depth buffer 300, the mesh is more sparse and in the more geometrically complex parts of depth buffer 300, the mesh is more dense.

Figure 4:
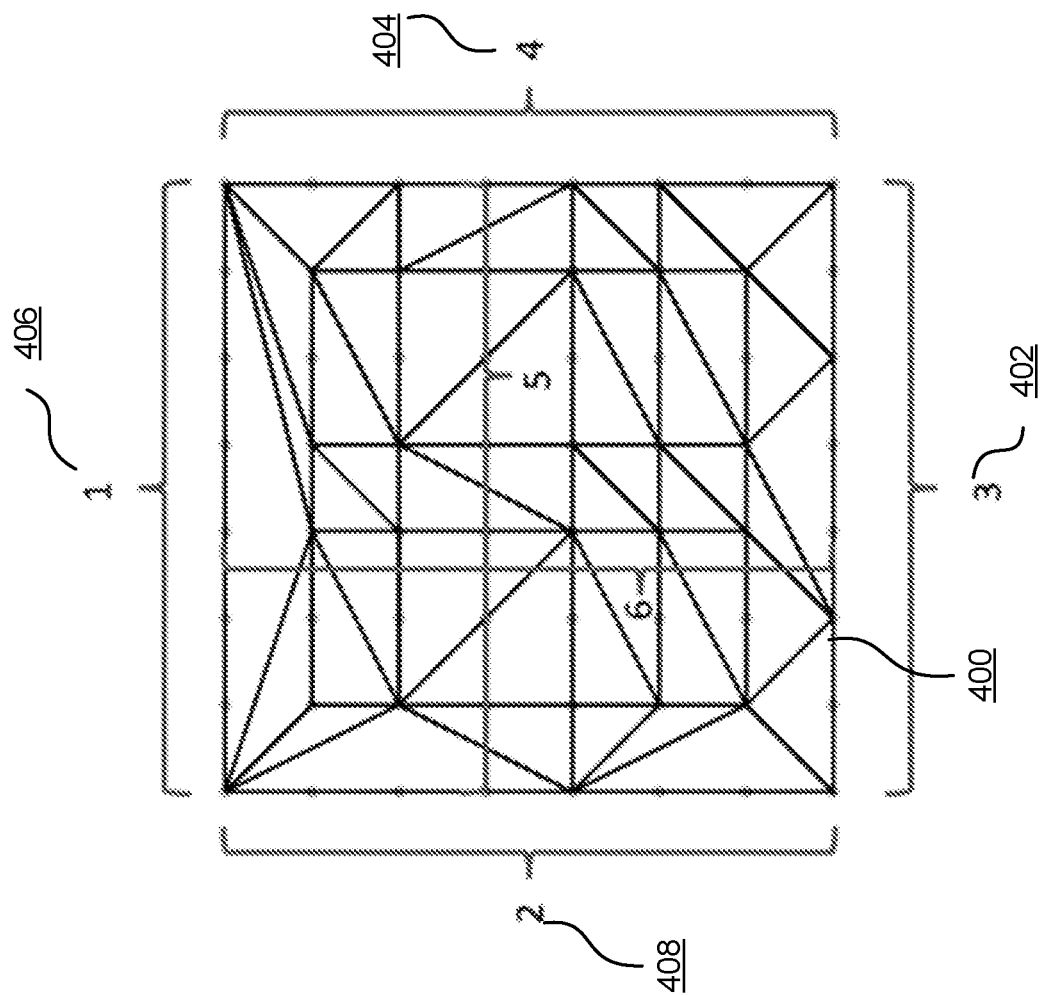
FIG. 4 illustrates an example tessellated patch.
Figure 4:
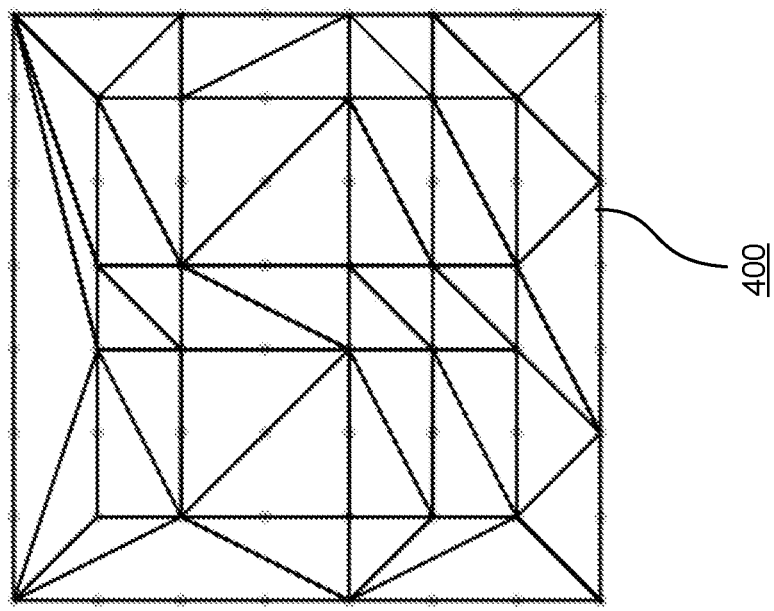

FIG. 4 illustrates an example tessellated patch. The same example tessellated patch 400 is shown twice. Patch 400 is a square patch which has been subdivided into triangles during tessellation. Six subdivision factors 402, 404, 406, 408, 410 and 412 are labelled on tessellated patch 400. The interior horizontal subdivision factor for mesh patch 400 is labelled as "5" in FIG. 4. The interior vertical subdivision factor for mesh patch 400 is labelled as "6" in FIG. 4. The rest of the subdivision factors correspond to the edges of the patch. Subdivision factor 402 is a subdivision factor for the bottom edge of the patch; subdivision factor 404 is a subdivision factor for the right edge of the patch; subdivision factor 406 is a subdivision factor for the top edge of the patch; subdivision factor 408 is a subdivision factor for the left edge of the patch. Existing tessellator technology uses six subdivision factors such as in FIG. 4 for each patch. The present technology uses three subdivision factors which correspond to the top edge, the left edge and the interior of each patch.

Figure 5:
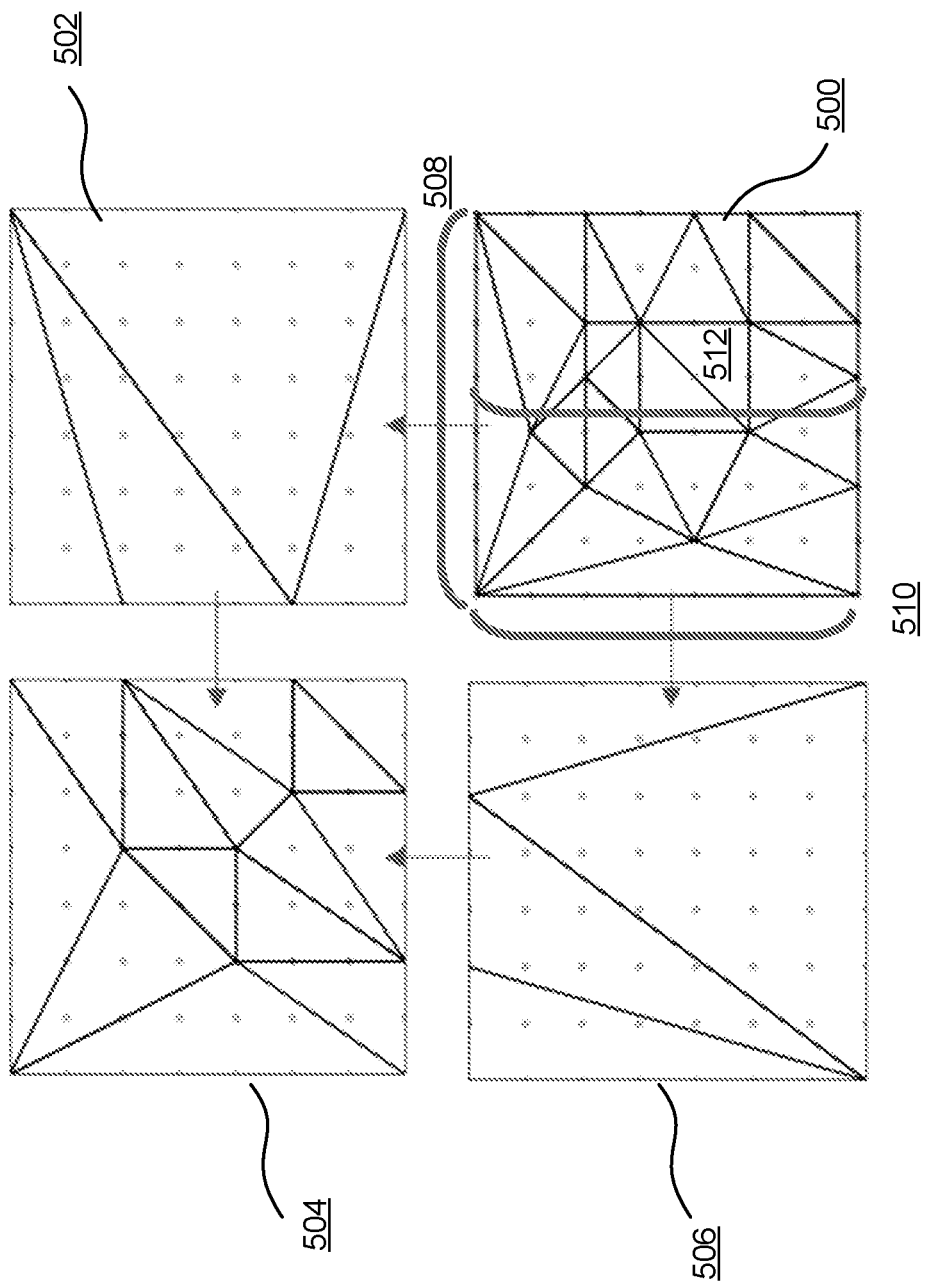
FIG. 5 is a schematic diagram of stitching together tessellated patches.

FIG. 5 is a schematic diagram of stitching together tessellated patches according to the present technology. Tessellated square mesh patches are stitched together in order to generate the indexed tessellated mesh 120. In various examples, each square patch 500, 502, 504, 506 is computed by querying the database of pre-computed patterns. For example, mesh patch 500 is generated by querying the database of pre-computed patterns using interior subdivision factor 512, top edge subdivision factor 508 and left edge subdivision factor 510. The top and left edge of each patch are matched to the inner subdivision factors of the patches to the top (patch 502) and the left (patch 506) of patch 500 respectively. Similarly, the top edge subdivision factor of patch 506 is matched to the interior subdivision factor of patch 504. The left edge subdivision factor of patch 502 is matched to the interior subdivision factor of patch 504. In various examples of the present technology, indexed tessellated mesh 120 is generated in such a manner.

Figure 6:
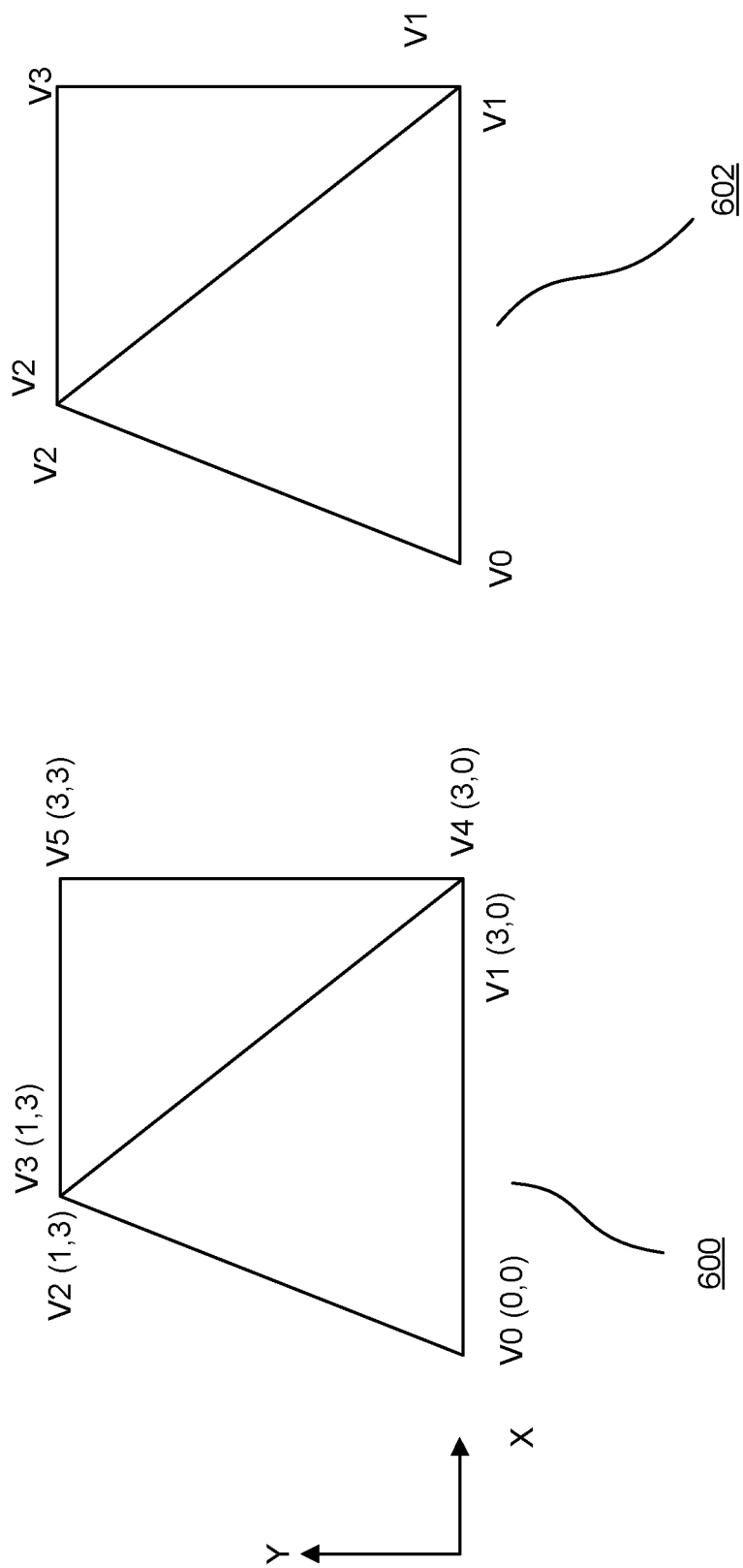
FIG. 6 shows example indexed and unindexed meshes.

FIG. 6 shows example indexed and unindexed meshes. Mesh 600 is an example unindexed mesh. Example unindexed mesh is defined by the coordinates of its vertices which are for example stored in a vertex buffer. Each vertex (V0, V1, V2, V3, V4, V5) in example unindexed mesh 600 is stored separately in the vertex buffer for example in a vertex buffer represented as [(0,0) (3,0) (1,3) (1,3) (3,0) (3,3)] wherein each tuple of x and y coordinates represents one vertex. In the vertex buffer, vertex coordinates are repeated where a vertex is shared between the two depicted triangles. V2 has the same coordinates as V3, and V1 has the same coordinates as V4.

Example indexed mesh 602 is for example defined by both a vertex buffer and an index buffer. A vertex buffer contains vertex coordinates of each vertex V0, V1, V2 and V3 shown as part of example indexed mesh 602. For example, a vertex buffer corresponding to 602 is represented as [(0,0) (3,0) (1,3) (3,3)] wherein each tuple of x and y coordinates represents one vertex. Coordinates of four vertices (as opposed to six) can be stored because mesh elements share vertices. An index buffer contains information about which of the vertices comprise each mesh element. Two mesh elements and an index buffer could for example be represented as [(0, 1, 2) (2, 1, 3)] wherein each triple of vertices defines a mesh element.

Typically storage of indexed meshes is more efficient than storage of unindexed meshes. An indexed mesh is fully connected if the vertex buffer does not contain any duplicate vertices. LSR methods may tessellate each mesh patch independently i.e. without using information of adjacent patches and therefore identical vertices at the common edge between adjacent patches being duplicated, which is computationally inefficient. On the other hand the present technology uses a fully connected indexed mesh for LSR.

Figure 7:
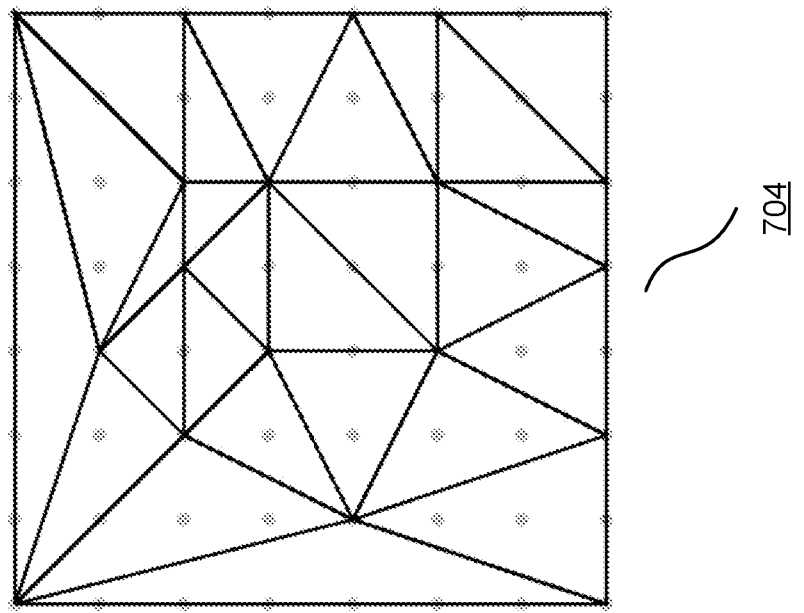
FIG. 7 shows an example of optimization of a tessellated patch.
Figure 7:
Figure 7:
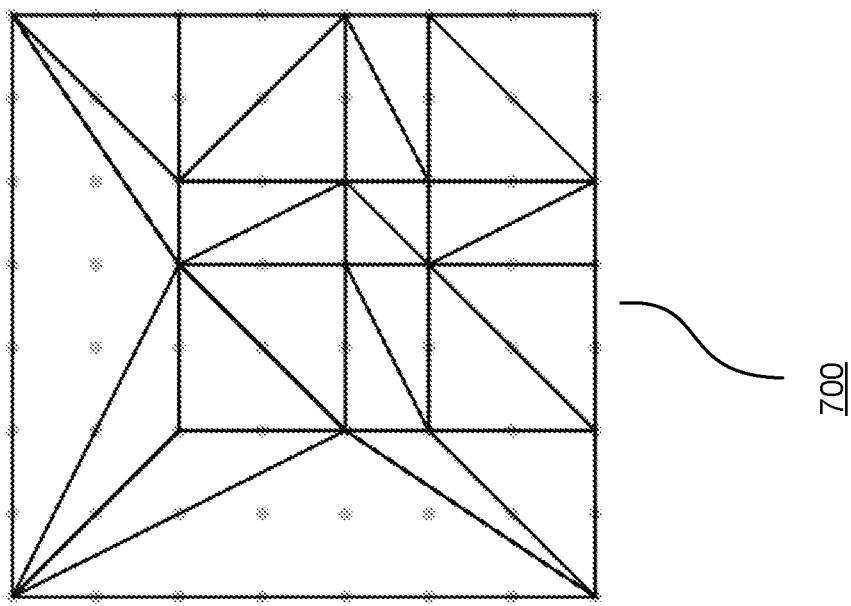

FIG. 7 shows an example of optimization of a tessellated patch. Example patch 700 is unoptimized. Example patch 704 is an optimized patch which is the result of mesh optimization 702. Example mesh optimization techniques applied as part of mesh optimization 702 include Laplacian smoothing and Delaunay triangulation. In other examples, any other suitable mesh optimization technique is applied during mesh optimization 702. A metric for quantifying the quality of polygonal meshes is the triangle aspect ratio, which is the ratio of the length of the longest edge to the length of the shortest edge of the triangle. Higher triangle aspect ratios indicate longer and thinner triangles. Example unoptimized mesh patch 700 has an average triangle aspect ratio of 1.94:1, whereas example optimized mesh patch 704 has an average triangle aspect ratio of 1.62:1. Therefore, both patches have the same triangle and vertex count but example optimized patch 704 has fewer slither triangles and therefore results in higher quality reprojection.

Figure 8:
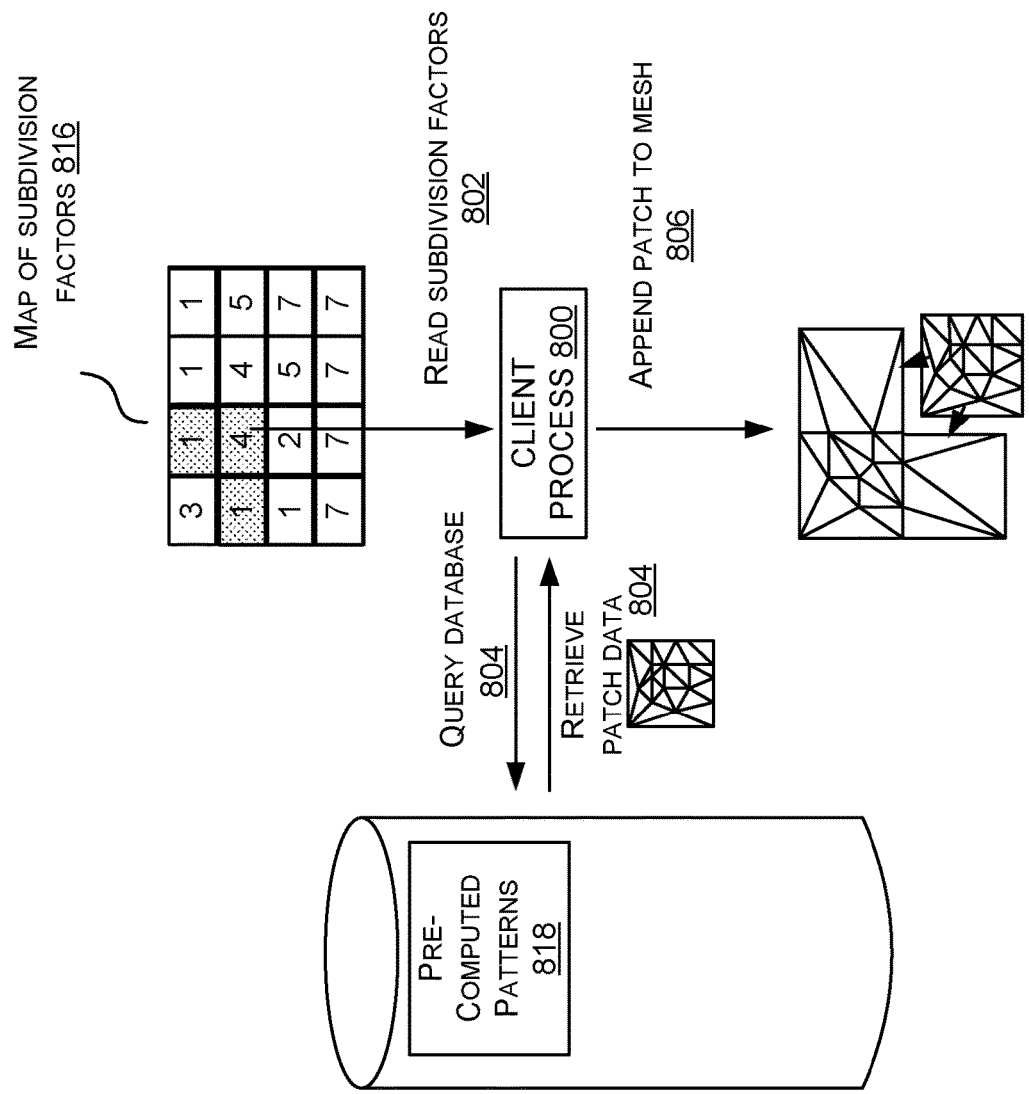
FIG. 8 is a schematic diagram of tessellation using a database of pre-computed patterns.

FIG. 8 is a schematic diagram of tessellation using a database of pre-computed patterns. A map of subdivision factors contains information about how each patch of mesh should be subdivided. For example, map of subdivision factors 816 contains a subdivision factor for each mesh patch represented by a square in FIG. 8. In various examples, when subdivision factors are read from the map of subdivision factors, a subdivision factor for a block as well as subdivision factors for the top and left neighbors of that block are read. For example, in FIG. 8 at 802 the subdivision factor "4" as well as its top neighbor "1" and its left neighbor "1" are read from map of subdivision factors 816. These are shown as shaded patches in map of subdivision factors 816. The subdivision factor of the top neighbor is the interior subdivision factor for the top neighboring patch, and it is also the subdivision factor for the top edge of the patch with interior subdivision factor "4". Similarly, the subdivision factor of the left neighbor is the interior subdivision factor for the left neighboring patch, and it is also the subdivision factor for the left edge of the patch with interior subdivision factor "4". Once the subdivision factors have been read, client process 800 involves querying the database of pre-computed patterns 818. In the example shown, the database is queried with the triple "4-1-1" and at 804, patch data corresponding to "4-1-1" are retrieved. The corresponding patch is then appended to the mesh at 806.

Figure 9:
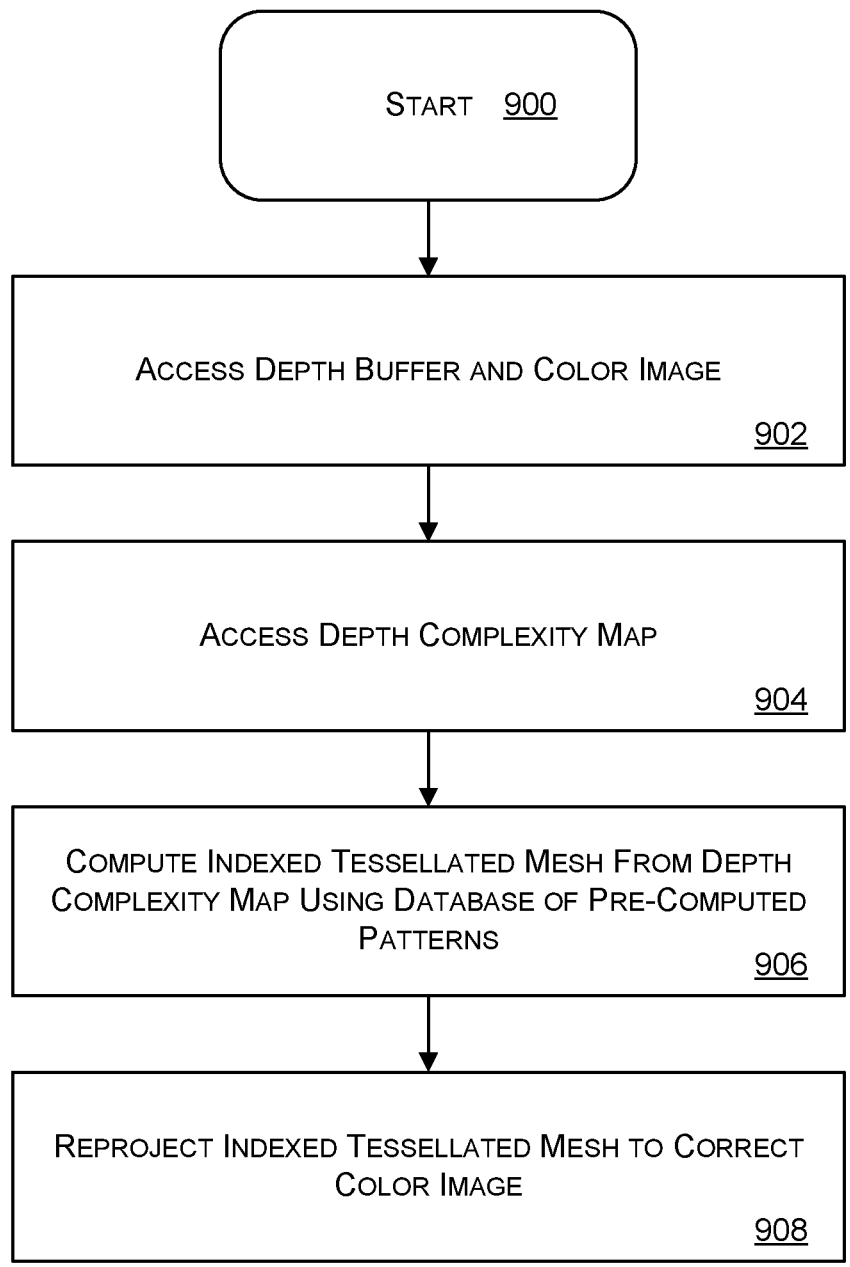
FIG. 9 is a flow diagram of an example method for late stage reprojection.

FIG. 9 is a flow diagram of an example method for late stage reprojection using a tessellated mesh. The method starts at block 900. At block 902, a depth buffer such as depth buffer 300, and color image for example color image 100 are accessed. At block 904, a depth complexity map is accessed. The depth complexity map corresponds to the depth buffer. For example, part of a depth complexity map is shown at 302 in FIG. 3 which corresponds to part of depth buffer 300. At 906, an indexed tessellated mesh is computed from the depth complexity map using a database of pre-computed patterns. In some examples, the indexed tessellated mesh is computed according to the example tessellation method depicted in FIG. 8.

In some examples the mesh is computed from the depth complexity map via a map of subdivision factors for example map of subdivision factors 816. The map of subdivision factors may be produced by scaling each value of the depth complexity map with a scale factor. Then each scaled depth complexity value is rounded to the to the nearest integer within an allowed range to produce a subdivision factor. For example the allowed range includes integer values up to but not including the size of the tessellated square mesh patch in pixels. The scale factor used to compute the map of subdivision factors controls the total number of triangles in the indexed tessellated mesh. The scale factor may therefore be selected such that a total triangle budget for the entire tessellated mesh is not exceeded, in turn placing a limit on computational cost. The triangle budget may be increased or decreased based on the available computational resources. Additionally or alternatively, the triangle budget depends on the difference between the predicted pose and the updated pose. For example a more significant difference between the predicted pose and the updated pose means a higher triangle budget.

The pre-computed pattern database 818 contains mesh patch data corresponding to mesh patches such as mesh patches 400, 700 and 704. Mesh patch data may correspond to optimized mesh patches such as example optimized mesh patch 704. The indexed tessellated mesh is then used in a reprojection process 908 to correct the color image. The reprojection process takes as input the predicted pose and the updated pose. The reprojection process transforms the color image according to how the predicted pose is transformed to the updated pose and where the transform is scaled according to a projection of the indexed tessellated mesh.

Figure 10:
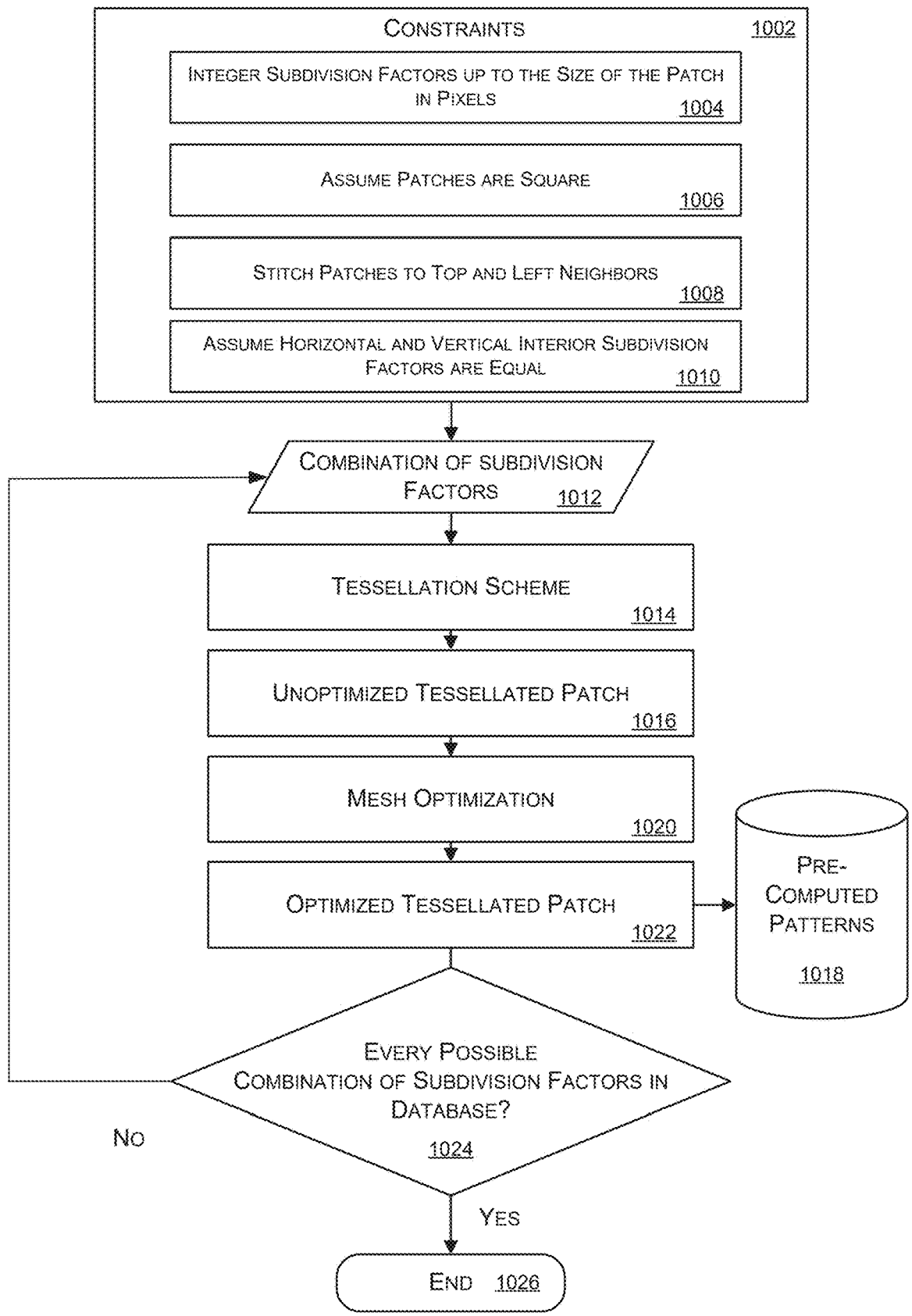
FIG. 10 is a flow diagram of an example method for generating a database of pre-computed patterns.

FIG. 10 is a flow diagram of an example method for generating a database of pre-computed patterns. In various examples including the method shown in FIG. 10, generation of the database of pre-computed patterns 1018 is based on applying various constraints 1002. The pre-computed pattern database 1018 comprises a table of data corresponding to tessellated square mesh patches such as mesh patches 400, 700 and 704. One of the constraints applied by the method depicted in FIG. 10 is therefore that the mesh patches are square. This is constraint 1006. Another constraint 1004 is that subdivision factors up to the size of the mesh patch in pixels are used. For example, if the mesh patch is 8×8 pixels in size, then possible subdivision factors range from 1 to 7. Another constraint 1008 is that patches are stitched together using only their top and left neighbors, for example using stitching such as the stitching illustrated in FIG. 5. Another constraint 1010 is that it is assumed that horizontal and vertical interior subdivision factors for each patch are equal. Therefore, each patch is associated with three subdivision factors: one factor corresponding to the interior of the patch, another corresponding to the top edge of the patch, and another corresponding to the left edge of the patch. The constraints 1002 determine the number of possible combinations of subdivisions. For each combination of subdivision factors 1012, tessellation scheme 1014 is used to generate unoptimized tessellated patch 1016 from an untesellated square mesh patch. Example tessellation schemes which may be used to produce an unoptimized tessellated square mesh patch include those employed by Direct3D 11 (trade mark) or Vulkan (trade mark). In various examples, mesh optimization 1020 is then applied to unoptimized tessellated patch 1016 and the result is the optimized tessellated patch 1022. Any mesh optimization process can be used such as the ones described with reference to FIG. 7. An example optimized mesh patch is shown at 704 in FIG. 7 and an example unoptimized mesh patch is shown at 700 in FIG. 7. Pattern data corresponding to optimized tessellated patch 1022 is stored in database of pre-computed patterns 1018. Pattern data is generated in such a manner for each combination of subdivision factors until data corresponding to every possible combination of subdivision factors is in the database of pre-computed patterns. At 1024, there is a check to see whether data corresponding to every possible combination of subdivision factors is in the database. If there are more combinations of subdivision factors to add to the database then pattern data is generated for the next combination of subdivision factors. If data corresponding to all of the possible combinations of subdivision factors is in the database of pre-computed patterns then the method ends at 1026.

Figure 11:
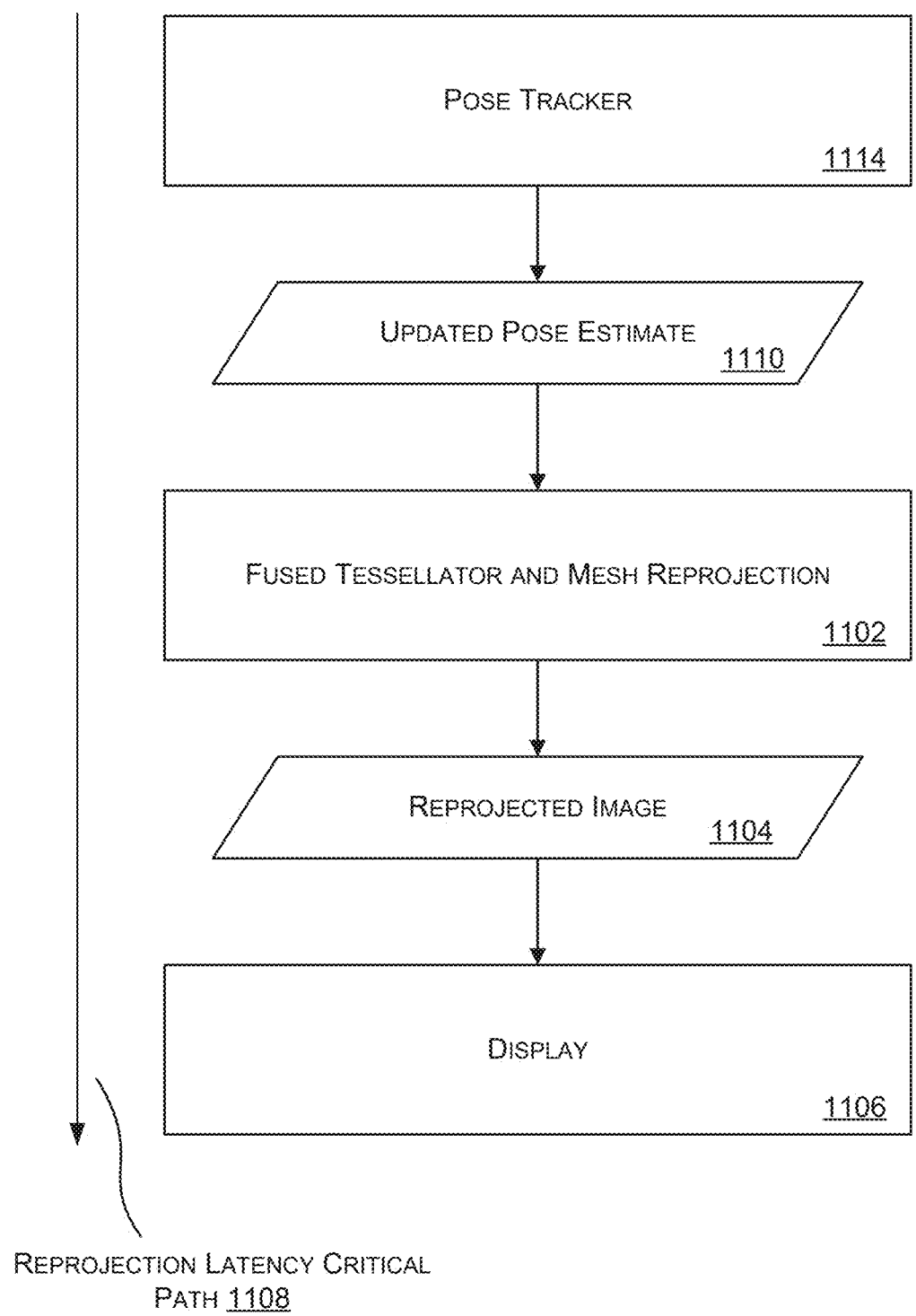
FIG. 11 is a flow diagram of an example method for late stage reprojection using fused tessellator and mesh reprojection.

FIG. 11 is a flow diagram of an example method for late stage reprojection using a fused tessellator and mesh reprojection. FIG. 11 is illustrative of existing LSR methods which employ fused tessellator and mesh reprojection 1102. Tessellation and reprojection processes are combined because of the very high number of possible tessellated mesh patches, which means that tessellated patches are computed on the fly. In the method shown in FIG. 11 pose tracker 1114 computes an updated pose estimate which is used for LSR. Fused tessellation and mesh reprojection 1102 occur after the updated pose estimate has been computed. Reprojected image 1104 is then generated at 1103 and displayed at 1108. A reprojection latency critical path is shown at arrow 1108. Reprojection latency is the time difference between sampling an updated target pose for reprojection and displaying the reprojected result on screen. The reprojection latency critical path 1108 shows the parts of the method which contribute to reprojection latency. In existing methods for LSR such as method tessellation is part of the latency critical path.

Figure 12:
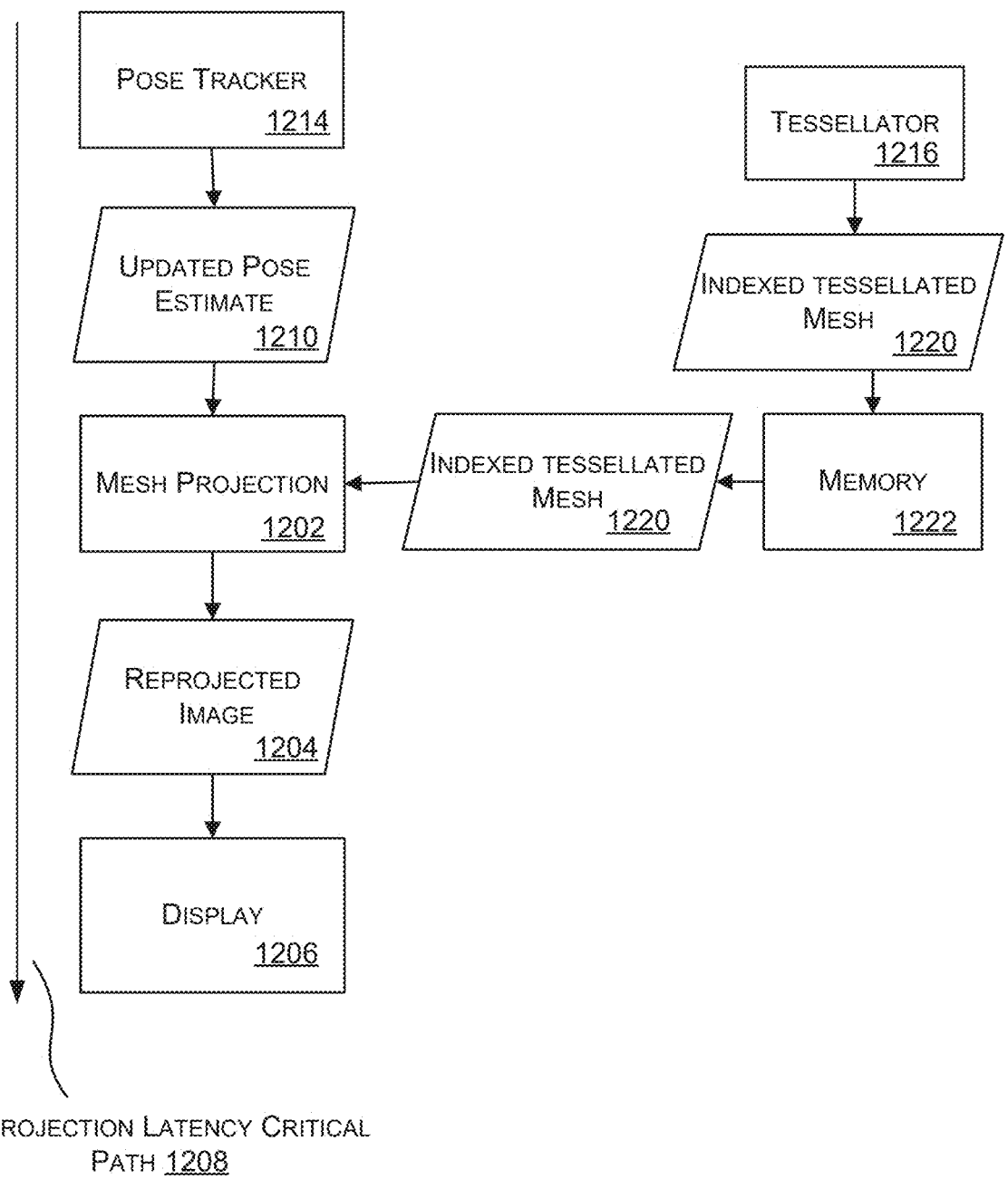
FIG. 12 is a flow diagram of an example method for late stage reprojection using an indexed tessellated mesh.

FIG. 12 is a flow diagram of an example method for late stage reprojection using an indexed tessellated mesh. The method in FIG. 12 is an example of the present technology disclosed herein. Pose tracker 1214 computes an updated pose estimate 1210 which is used for LSR. The indexed tessellated mesh 1220 is reprojected at 1202 and reprojected image 1204 is displayed at 1206. Projecting the mesh 1202 is part of the reprojection latency critical path 1208. However, in contrast to the method depicted in FIG. 11, tessellation is not part of reprojection latency critical path 1208. Instead, the indexed tessellated mesh 1220 is generated by tessellator 1216 outside of the reprojection latency critical path, streamed into memory 1222 and then used for mesh reprojection at 1202. Therefore, compared to existing methods such as the method in FIG. 11 the reprojection latency is reduced and reprojection is of higher quality.

Figure 13:
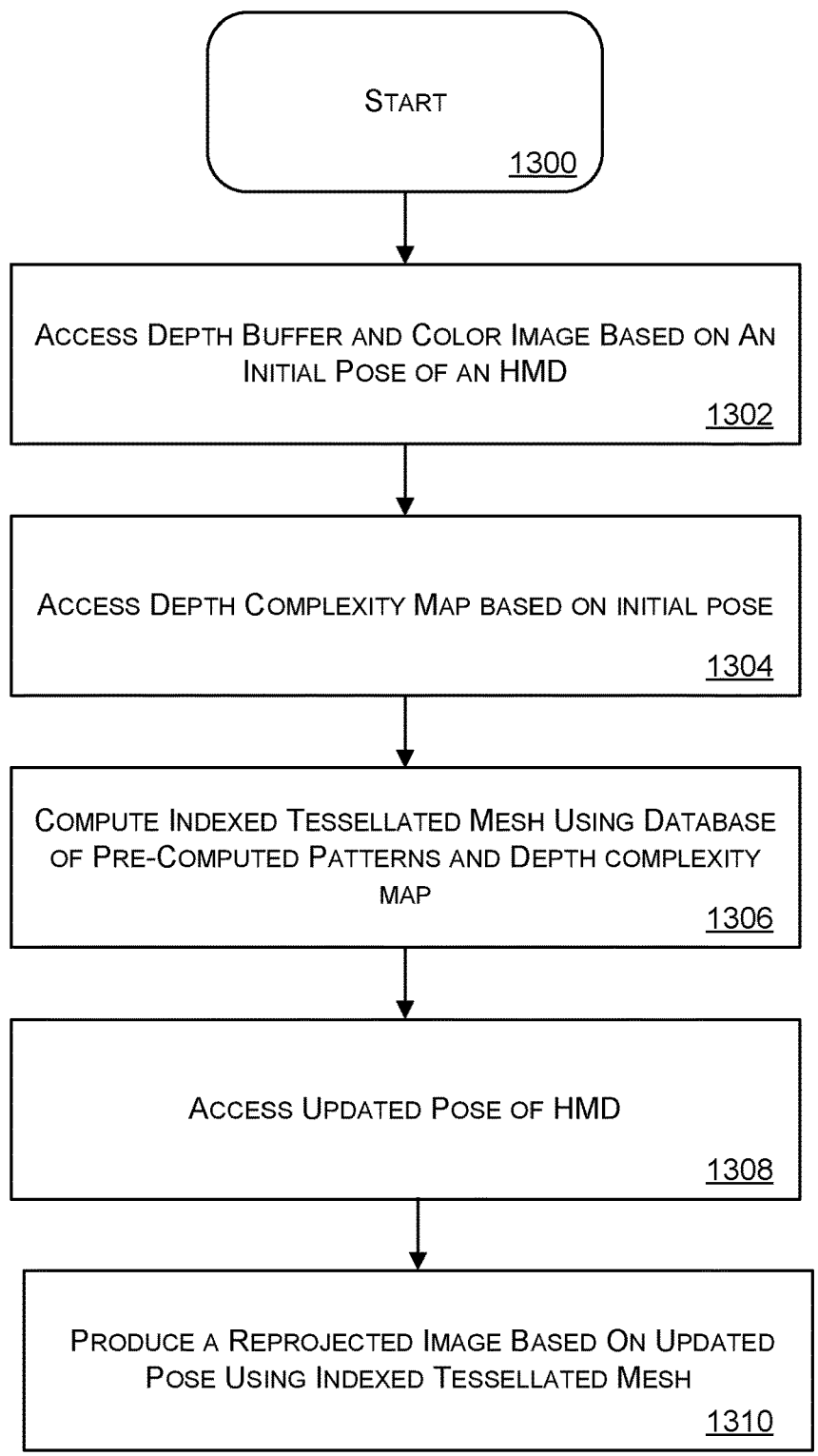
FIG. 13 is a flow diagram of an example method for late-stage reprojection.

FIG. 13 is a flow diagram of an example method for late-stage reprojection. The method starts at block 300. At block 1302, a depth buffer and color image which are based on an initial pose of an HMD are accessed. At 1304, a depth complexity map which is also based on the initial pose is accessed. An indexed tessellated mesh is computed using database of pre-computed patterns at the depth complexity map at 1306. The mesh is computed using for example the method illustrated in FIG. 8. Then, an updated pose of the HMD is accessed at 1308. The updated pose of the HMD is estimated based captured sensor data such as from any one or more of: a global positioning system, an accelerometer, a gyroscope, a depth camera, a video camera, a color camera. At 1310, the indexed tessellated mesh is used to produce a reprojected image based on the updated pose of the HMD.

Figure 14:
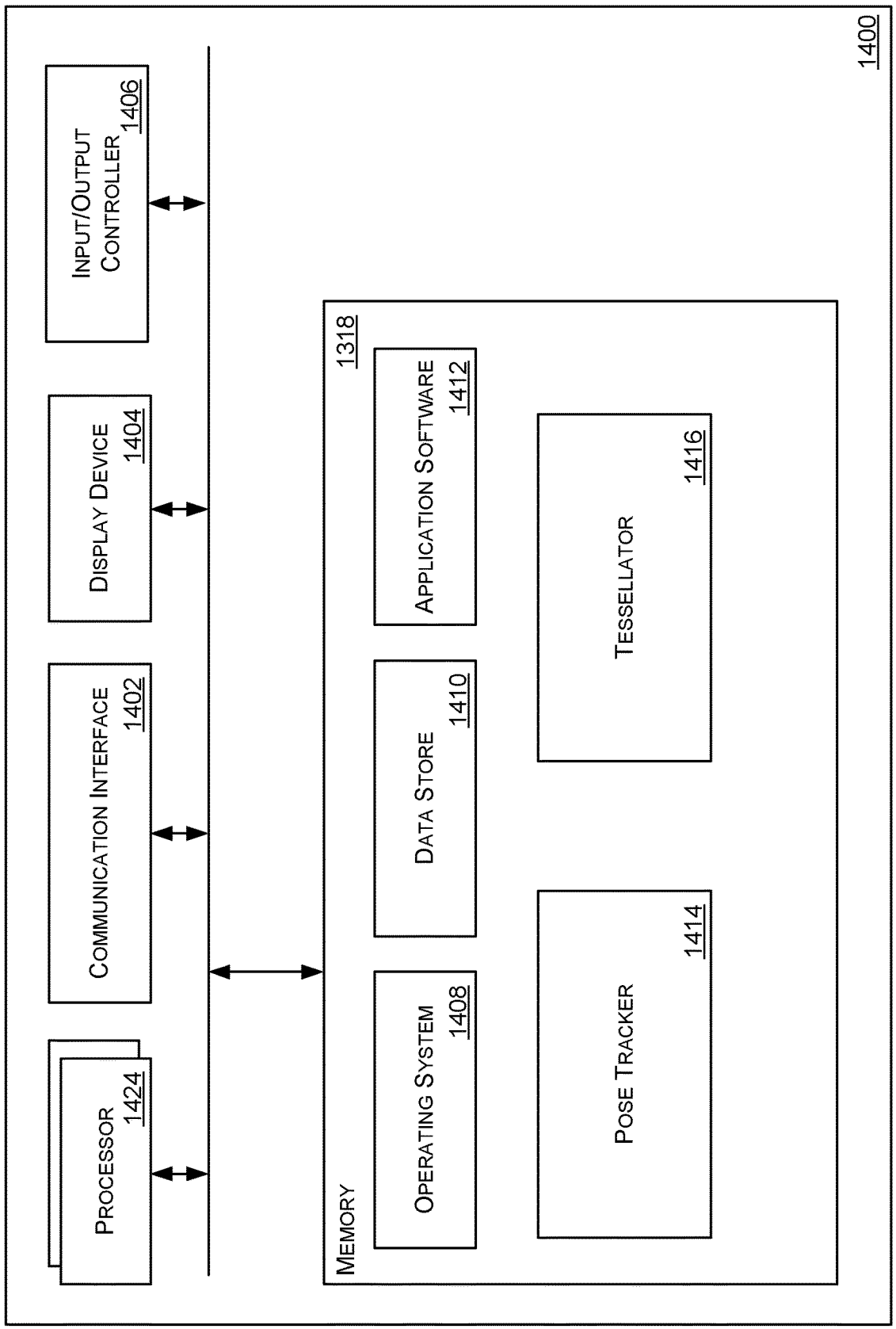
FIG. 14 illustrates an exemplary computing-based device in which embodiments of late stage reprojection using a tessellated mesh are implemented.

FIG. 14 illustrates an exemplary computing-based device in which embodiments of late stage reprojection using a tessellated mesh are implemented. Computing-based device 1400 comprises one or more processors 1424 which are microprocessors, controllers, or any other suitable type of processors for processing computer executable instructions to control the operation of the device in order to compute pose predictions of display pose of a client computing device. In some examples, for example where a system on a chip architecture is used, the processors 1424 include one or more fixed function blocks (also referred to as accelerators) which implement a part of the methods disclosed herein in hardware (rather than software or firmware). Platform software comprising an operating system 1408 or any other suitable platform software is provided at the computing-based device to enable application software 1412 to be executed on the device. A data store 1014 holds for example sensor data, pose data, mesh data or any type of data suitable for late stage reprojection using a tessellated mesh. A pose tracker 1414 is functionality deployed in a computing device for computing a position and orientation of the computing device over time. Tessellator 1416 is functionality deployed in a computing device for generating a tessellated mesh.

The computer executable instructions are provided using any computer-readable media that are accessible by computing based device 1400. Computer readable media include, for example, computer storage media such as memory 1418 and communications media. Computer storage media, such as memory 1418, include volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1418) is shown within the computing-based device 1400 it will be appreciated that the storage is, in some examples, distributed or located remotely and accessed via a network or other communication link (e.g. using communication interface 1404). The computing-based device 1400 has a display device 1404 to display output images and/or values of parameters.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

Clause A. A method of late stage reprojection comprising: accessing a depth buffer and a color image; accessing a depth complexity map; computing an indexed tessellated mesh from the depth complexity map using a database of pre-computed patterns; and reprojecting the indexed tessellated mesh to correct the color image. The color image is corrected by transforming it according to an updated pose estimate and where the transform is weighted by a projection from the indexed tessellated mesh.

Clause B. The method of clause A comprising: storing the indexed tessellated mesh in memory; at a later time, computing an updated pose prediction of a pose of a client device; retrieving the indexed tessellated mesh from memory; rendering the indexed tessellated mesh using the updated pose prediction.

Clause C. The method of clause A or clause B performed by a client device and wherein the database of pre-computed patterns is stored at the client device.

Clause D. The method of any preceding clause wherein the database of pre-computed patterns comprises a table of data corresponding to tessellated square mesh patches, each tessellated square mesh patch being indexed according to three subdivision factors.

Clause E. The method of clause D wherein the subdivision factors are integers up to the size of the tessellated square mesh patch in pixels.

Clause F. The method of clause D or E wherein one subdivision factor is a subdivision factor for the interior of the tessellated square mesh patch, another subdivision factor is a subdivision factor for the top edge of the tessellated square mesh patch, and another subdivision factor is a subdivision factor for the left edge of the tessellated square mesh patch.

Clause G. The method of clause D, E or F wherein each vertex in the square mesh patch corresponds to one pixel in the depth buffer.

Clause H. The method of any preceding clause wherein the indexed tessellated mesh is computed by: reading three subdivision factors from a map of subdivision factors; querying the database of pre-computed patterns with the three subdivision factors; retrieving pattern data corresponding to a tessellated square mesh patch from the database of pre-computed patterns; and appending the tessellated square mesh patch data to the indexed tessellated mesh by combining local coordinates of the vertices within the tessellated square mesh patch with a global position of the tessellated square mesh patch and copying the resulting values to an output mesh buffer.

Clause I. The method of clause H wherein the map of subdivision factors is computed using the depth complexity map and further wherein the depth complexity map is computed using a planar deviation metric and the planar deviation metric is computed using the depth buffer.

Clause J. The method of any preceding clause, wherein the indexed tessellated mesh is optimized.

Clause K. The method of clause J wherein the mesh in optimized by optimizing each square mesh patch using one or both of Laplacian smoothing and Delaunay triangulation.

Clause L. The method of any preceding clause, the indexed tessellated mesh is a vertex-buffer-less indexed tessellated mesh.

Clause M. An apparatus comprising: a processor; a memory storing instructions that, when executed by the processor, perform a method for late stage reprojection, comprising: accessing a depth buffer and a color image; accessing a depth complexity map; computing an indexed tessellated mesh from the depth complexity map using a database of pre-computed patterns; reprojecting the indexed tessellated mesh to correct the color image.

Clause N. The apparatus of clause M wherein the method further comprises: storing the indexed tessellated mesh in memory; at a later time, computing an updated pose prediction of a pose of a client device; retrieving the indexed tessellated mesh from memory; rendering the indexed tessellated mesh using the updated pose prediction.

Clause O. The apparatus of clause M or clause N wherein the apparatus is a client device.

Clause P. The apparatus of clause M, N or O wherein: the database of pre-computed patterns comprises a table of data corresponding to tessellated square mesh patches, each tessellated square mesh patch being indexed according to three subdivision factors; further wherein subdivision factors are integers up to the size of the tessellated square mesh patch in pixels, and; further wherein one subdivision factor is a subdivision factor for the interior of the tessellated square mesh patch, another subdivision factor is a subdivision factor for the top edge of the tessellated square mesh patch, and another subdivision factor is a subdivision factor for the left edge of the tessellated square mesh patch.

Clause Q. The apparatus of clause M, N, O or P wherein the indexed tessellated mesh is computed by: reading three subdivision factors from a map of subdivision factors; querying the database of pre-computed patterns with the three subdivision factors; retrieving pattern data corresponding to a tessellated square mesh patch from the database of pre-computed patterns; and appending the tessellated square mesh patch data to the indexed tessellated mesh by combining local coordinates of the vertices within the tessellated square mesh patch with a global position of the tessellated square mesh patch and copying the resulting values to an output mesh buffer.

Clause R. The apparatus of clause Q, wherein the map of subdivision factors is computed using the depth complexity map and further wherein the depth complexity map is computed using a planar deviation metric and the planar deviation metric is computed using the depth buffer.

Clause S. A method for image reprojection, the method comprising: accessing a depth buffer and a color image wherein the depth buffer and color image are based on an initial pose of a head-mounted display HMD device; accessing a depth complexity map based on the initial pose; computing an indexed tessellated mesh using a database of pre-computed patterns and the depth complexity map; accessing an updated pose of the HMD device; and producing a reprojected image based on the updated pose of the HMD device using the indexed tessellated mesh.

Clause T. The method of clause S wherein the indexed tessellated mesh is computed by: reading three subdivision factors from a map of subdivision factors; querying the database of pre-computed patterns with the three subdivision factors; retrieving pattern data corresponding to a tessellated square mesh patch from the database of pre-computed patterns; and appending the tessellated square mesh patch data to the indexed tessellated mesh by combining local coordinates of the vertices within the tessellated square mesh patch with a global position of the tessellated square mesh patch and copying the resulting values to an output mesh buffer.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of late stage reprojection comprising:
computing a map of subdivision factors from a depth complexity map corresponding to an image, the map of subdivision factors containing a subdivision factor for a mesh patch;
identifying, from a database comprising a plurality of pre-computed patterns, a pre-computed pattern comprising patch data defining a tessellated mesh patch, the tessellated mesh patch corresponding to the subdivision factor; and
reprojecting the image using the tessellated mesh patch.

2. The method of claim 1, comprising:
storing the tessellated mesh patch in memory;
at a later time, computing an updated pose prediction of a pose of a client device;
retrieving the tessellated mesh patch from memory; and
rendering the tessellated mesh patch using the updated pose prediction.

3. The method of claim 1, performed by a client device and wherein the database is stored at the client device.

4. The method of claim 1, wherein the tessellated mesh patch is indexed according to three subdivision factors.

5. The method of claim 4, wherein the subdivision factors are integers up to but not including a size of the tessellated mesh patch in pixels.

6. The method of claim 5, wherein one subdivision factor is a subdivision factor for an interior of the tessellated mesh patch, another subdivision factor is a subdivision factor for a top edge of the tessellated mesh patch, and another subdivision factor is a subdivision factor for a left edge of the tessellated mesh patch.

7. The method of claim 5, wherein each vertex in the mesh patch corresponds to a corresponding pixel in a depth buffer.

8. The method of claim 1 wherein;
the tessellated mesh patch is identified by:
reading three subdivision factors, inclusive of the subdivision factor, from the map of subdivision factors;
querying the database with the three subdivision factors; and
retrieving patch data defining the tessellated mesh patch from the database; and
the method further comprises appending the tessellated mesh patch to a tessellated mesh by combining local coordinates of vertices within the tessellated mesh patch with a global position of the tessellated mesh patch and copying resulting values to an output mesh buffer.

9. The method of claim 8, wherein the depth complexity map is computed using a planar deviation metric computed using a depth buffer.

10. The method of claim 1, wherein the tessellated mesh patch is optimized.

11. The method of claim 10 wherein the tessellated mesh patch is optimized using one or both of Laplacian smoothing and Delaunay triangulation.

12. The method of claim 1 wherein the tessellated mesh patch is stitched to other tessellated mesh patches to form a fully connected vertex-buffer-less indexed tessellated mesh, wherein data associated with each vertex of the tessellated mesh patch is encoded into an index buffer.

13. An apparatus comprising:
a processor;
a memory storing instructions that, when executed by the processor, perform a procedure for late stage reprojection, comprising:
computing a map of subdivision factors from a depth complexity map corresponding to an image, the map of subdivision factors containing a subdivision factor for a mesh patch;
identifying, from a database comprising a plurality of pre-computed patterns, a pre-computed pattern comprising patch data defining a tessellated mesh patch, the tessellated mesh patch corresponding to the subdivision factor; and
reprojecting the image using the tessellated mesh patch.

14. The apparatus of claim 13 wherein the method procedure further comprises:
storing the tessellated mesh patch in memory;
at a later time, computing an updated pose prediction of a pose of a client device;
retrieving the tessellated mesh patch from memory; and
rendering the tessellated mesh patch using the updated pose prediction.

15. The apparatus of claim 13 wherein the apparatus is a client device.

16. The apparatus of claim 13 wherein:
each tessellated mesh patch is indexed according to three subdivision factors inclusive of the subdivision factor;
the three subdivision factors are integers up to a size of the tessellated mesh patch in pixels; and
wherein the three subdivision factors comprise a first subdivision factor for an interior of the tessellated mesh patch, a second subdivision factor for a top edge of the tessellated mesh patch, and a third subdivision factor for a left edge of the tessellated mesh patch.

17. The apparatus of claim 13 wherein:
the tessellated mesh patch is computed by:
reading three subdivision factors inclusive of the subdivision factor;
querying the database with the three subdivision factors; and
retrieving the patch data defining the tessellated mesh patch from the database; and
the procedure further comprises appending the tessellated mesh patch to a tessellated mesh by combining local coordinates of vertices within the tessellated mesh patch with a global position of the tessellated mesh patch and copying resulting values to an output mesh buffer.

18. The apparatus of claim 17, wherein the depth complexity map is computed using a planar deviation metric computed using a depth buffer.

19. A method for image reprojection, the method comprising:
computing a map of subdivision factors from a depth complexity map corresponding to an image, the map of subdivision factors containing a subdivision factor for a mesh patch, the image is based on an initial pose of a head-mounted display (HMD) device;

identifying, from a database comprising a plurality of pre-computed patterns, a pre-computed pattern comprising patch data defining a tessellated mesh patch, the tessellated mesh patch corresponding to the subdivision factor;

accessing an updated pose of the HMD device; and producing a reprojected image based on the updated pose of the HMD device using the tessellated mesh patch.

20. The method of claim 19, wherein;

the tessellated mesh patch is computed by:
  reading three subdivision factors, inclusive of the subdivision factor, from the map of subdivision factors;
  querying the database with the three subdivision factors; and
  retrieving the patch data defining the tessellated mesh patch from the database; and the method further comprises appending the tessellated mesh patch to a tessellated mesh by combining local coordinates of vertices within the tessellated mesh patch with a global position of the tessellated mesh patch and copying resulting values to an output mesh buffer.

* * * * *